United States Patent [19]
Loxley et al.

[11] Patent Number: 5,438,823
[45] Date of Patent: Aug. 8, 1995

[54] HEAT EXCHANGE APPARATUS FOR GAS TURBINE FLUIDS

[75] Inventors: Russell A. Loxley, Leicestershire; Andrew Clarke, Nottingham, both of England

[73] Assignee: Rolls-Royce, plc, Derby, England

[21] Appl. No.: 81,321

[22] PCT Filed: Dec. 20, 1991

[86] PCT No.: PCT/GB91/02294
§ 371 Date: Jun. 18, 1993
§ 102(e) Date: Jun. 18, 1993

[87] PCT Pub. No.: WO92/11451
PCT Pub. Date: Jul. 9, 1992

[30] Foreign Application Priority Data
Dec. 21, 1990 [GB] United Kingdom ............... 9027782

[51] Int. Cl.6 ............................................. F02C 7/14
[52] U.S. Cl. ............................... 60/39.08; 165/41
[58] Field of Search ................. 60/39.08; 165/41; 184/6.11, 6.22

[56] References Cited

U.S. PATENT DOCUMENTS 4,696,156 9/1987 Burr et al. ..................... 60/39.08
5,121,598 6/1992 Butler .......................... 60/39.08

FOREIGN PATENT DOCUMENTS 0146487 6/1985 European Pat. Off. .
0248762 12/1987 European Pat. Off. .
0391609 10/1990 European Pat. Off. .
2131094 11/1982 United Kingdom .
2111128 6/1983 United Kingdom .

Primary Examiner—John C. Fox
Attorney, Agent, or Firm—Cushman Darby & Cushman

[57] ABSTRACT

A gas turbine engine heat exchange apparatus comprises a first heat exchanger (12), which is arranged to receive oil from a lubricating oil system of the engine and put the oil in heat exchange with either a cooling or heating medium (17, 21), and a second heat exchanger (26), which receives the oil from the first heat exchanger, puts the oil in heat exchange with fuel in the engine's fuel supply system and discharges the oil back to the lubricating oil system. A valve or valves (20, 24) are used to control flow from high and low temperature sources of the heat exchange medium through the first heat exchanger (12) such that the direction of heat flow between the oil and the cooling or heating medium can be changed as necessary to prevent the fuel temperature from straying beyond predetermined limits.

11 Claims, 1 Drawing Sheet

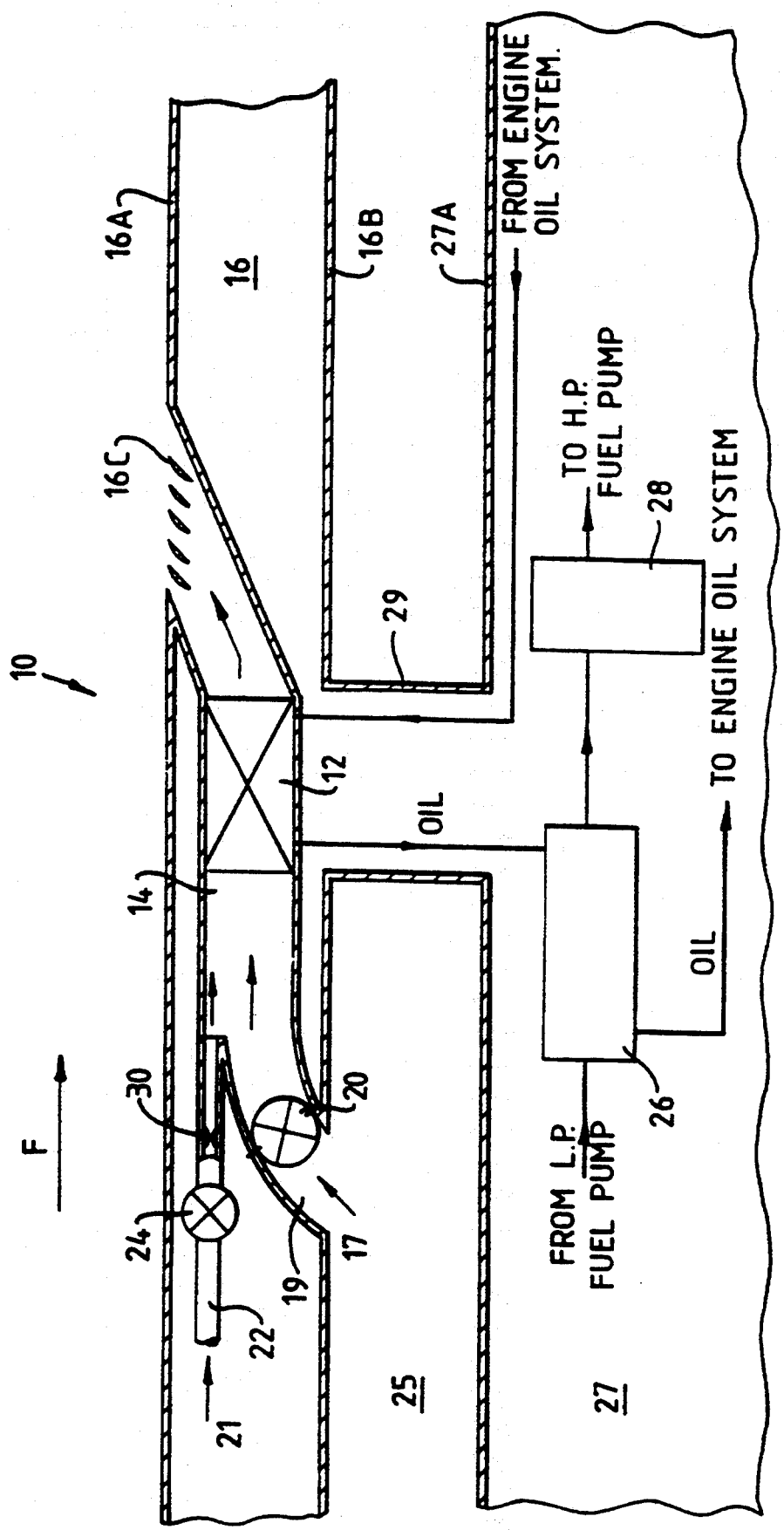

HEAT EXCHANGE APPARATUS FOR GAS TURBINE FLUIDS

FIELD OF THE INVENTION

The present invention relates to heat exchange apparatus, in particular heat exchange apparatus for use in connection with gas turbine engines, especially aeroengines.

BACKGROUND OF THE INVENTION

In gas turbine aeroengines it is necessary to maintain the engine fuel and the engine lubricating oil within predetermined ranges of temperature so that the fuel and oil temperatures are suitable throughout the whole range of engine operation.

It is common practice to use the engine fuel as a heat sink to cool the engine lubricating oil, using a fuel cooled oil cooler heat exchanger. However, in the operation of certain large passenger aircraft it has been found to be necessary for the engine lubricating oil to be independently heated or cooled to avoid the fuel temperature straying outside acceptable limits.

SUMMARY OF THE INVENTION

The present invention seeks to provide a more convenient arrangement whereby the engine lubricating oil can be selectively heated or cooled prior to being in heat exchange relationship with the engine fuel.

Accordingly, the present invention provides a heat exchange apparatus comprising a first heat exchanger arranged to receive engine lubricating oil from an engine and put the oil in heat exchange relationship with a heat exchange medium and a second heat exchanger arranged to receive the engine oil from the first heat exchange apparatus, put it in heat exchange relationship with fuel for the engine and pass the oil back to the engine, and means for controlling the temperature of the heat exchange medium before it enters the first heat exchanger so as to selectively cool and heat the lubricating oil from the engine.

Also according to the invention, a heat exchange apparatus for a combustion engine having a lubrication oil system and a fuel supply system, comprises a first heat exchange means arranged to receive oil from the lubrication oil system and to put the oil in heat exchange relationship with a heat exchange medium, a second heat exchange means arranged to receive the oil from the first heat exchange means, put the oil in heat exchange relationship with fuel in the fuel system and to return the engine oil to the engine, high and low temperature sources of said heat exchange medium, and valve means for controlling flow from the high and low temperature sources of the heat exchange medium through the first heat exchange means such that the direction of heat flow between the oil and the heat exchange medium can be changed as necessary to prevent the fuel temperature from straying beyond predetermined limits.

If the engine is a turbofan aeroengine, the heat exchange medium can either be a flow of hot air from the engine's compressor or a flow of cooler air from the freestream or from a bypass duct of the gas turbine engine.

A control valve or valves can be provided in order to control the flow of air into the first heat exchanger.

The present invention will now be more particularly described with reference to the accompanying drawing which shows diagramatically one form of heat exchange apparatus according to the present invention.

BRIEF DESCRIPTION OF THE INVENTION

The sole drawing diagrammatically shows park of a turbofan aeroengine in longitudinal axial cross-section, together with a heat exchange apparatus in accordance with the invention and the fluid flows associated with it.

DETAILED DESCRIPTION OF THE INVENTION

Referring to the drawing, which is not to scale, the heat exchange apparatus or system 10 comprises a first air/oil heat exchanger 12 which is located in a duct 14 formed between the outer and inner walls 16A,16B of an outer casing or cowling 16 of the engine. Cool low pressure air 17 is allowed to enter the duct 14 from a smaller duct 19 under the control of a fully variable butterfly or flap valve 20 which has an actuator (not shown) operated under software control by an electronic engine controller (EEC, not shown). Both the actuator and the electronic controller may be of types generally well known in the industry. The duct 14 can also receive a flow of hotter, higher pressure air 21 through a duct 22, the air 21 being tapped from a compressor (not shown) in the central part 27 of the engine. The flow of air through the duct 22 into the duct 14 is under the control of a small rotary valve 24 and its actuator (not shown), which is controlled by the EEC and again may be of known type.

As illustrated, the duct 19 is preferably connected to an air take-off point in the innner wall 16B of the cowling 16, which defines the outer boundary of an annular bypass duct 25 of the turbofan engine. Hence the pressure and temperature of the air 17 has already been somewhat raised above ambient atmospheric values by virtue of being compressed by a fan rotor situated forward of the part of the engine shown in the drawing. A possible alternative to this arrangement, if cooler and lower pressure air is needed, is to take air from the free airstream F flowing over the outside of the engine during flight, in which instance a ram air intake on the outside surface 16A of the casing 16 would be required. After passing through the heat exchanger 12 in duct 14, the air is exhausted from exit louvres 16C in the outer wall 16A of the cowling 16 to mix with the freestream air F.

Valves 20 and 24 may function independently as shown, or may be incorporated in a single unit. In the latter case, a single rotary valve may be constructed to have two ranges of movement for the cool and hot air respectively, the valve being controlled by a single actuator.

As shown, the heat exchanger 12 also receives a flow of engine lubricating oil from the engine, besides either the flow of relatively cool air from the bypass duct 25 through the valve 20, or the flow of relatively hot air 22 from the engine compressor through the control valve 24.

The heat exchange system 10 also includes a second heat exchanger 26 which is preferably mounted within an outer wall or fairing 27A of the central part 27 of the engine. It receives the engine lubricating oil from the heat exchanger 12 and discharges the oil back to the rest of the lubricating oil system in the engine. The heat exchanger 26 also receives engine fuel from a low pressure fuel pump (not shown) in an earlier low pressure part of the engine's fuel system and discharges the fuel through a filter 28 to a high pressure fuel pump (not shown) in a later part of the engine's fuel system leading to a fuel metering unit and the engine's combustor.

Oil is conveyed from the central part 27 of the engine inboard of the fan duct 25 to the heat exchanger 12 and back again by means of pipes passing through the hollow interior of a strut or fan exit guide vane 29 spanning the duct. This strut or vane 29 is part of an array of such struts or vanes, which are angularly spaced apart in the bypass duct 25 around the central part of the engine 27. The air 21 from the compressor is also carried across the fan duct 25 in this way, though preferably in a different but angularly adjacent strut or vane.

The purpose of the heat exchange system 10 is, as and when required, to cool the engine lubricating oil, heat the engine fuel, indirectly heat the engine fuel by heating the engine lubricating oil, control the engine fuel temperature, and to cool the fuel in the low pressure part of the fuel system following throttling back of the engine. In particular, the engine lubricating oil can be cooled by using the fuel as a heat sink, or the fuel and/or the oil can be cooled by precooling the engine lubricating oil, or the fuel can be heated by preheating the engine lubricating oil.

To accomplish these purposes, temperatures in the lubricating oil and fuel supply systems of the engine are signalled by sensors (not shown) to the EEC and kept within desired predetermined ranges by software control of the valves 20 and 24. Operation of the valves in this way is linked with four control modes in which the heat exchange system 10 operates.

A first, normal, control mode is used when both oil and fuel temperatures can be maintained within desired predetermined limits, either by keeping both valves 20 and 24 closed, as is preferred for maximum economy of engine operation, or by keeping valve 24 closed and modulating valve 20, i.e. opening it to a varying extent. With both valves closed, the oil is cooled because heat from the oil is passed to the fuel flowing through heat exchanger 26, this heat then being carried away to the engine's combustor by the fuel. When valve 24 is closed and valve 20 is modulated, the fuel is cooled to keep it below its upper temperature limit because heat from the fuel is first passed to the oil flowing through heat exchanger 26 and then passed to the cool air 17 flowing through heat exchanger 12 in duct 14.

A second control mode is used when the oil temperature would otherwise be above a predetermined upper limit and the fuel temperature is within limits. Here again valve 20 is modulated with valve 24 closed, the oil being cooled because heat from the oil is passed to the cool air 17 flowing through heat exchanger 12 in duct 14.

A third control mode is used when the fuel temperature would otherwise be below a predetermined lower limit, but the oil temperature is within limits. Here, valve 20 is closed but valve 24 is open (optionally to a varying extent), and the fuel is heated because heat from the compressor air 21 is first passed to the oil flowing through heat exchanger 12 and then passed to the fuel flowing through heat exchanger 26.

A fourth control mode is used only following engine shutdown at altitude, as explained later.

Those skilled in this branch of technology will appreciate from the above that the heat exchanger 12 has a number of purposes, namely to provide supplementary oil cooling, to provide indirect supplementary fuel heating, to provide indirect control of the engine fuel temperature, and to provide indirect fuel cooling following throttling back of the engine.

It will further be appreciated that in the first or normal control mode the primary heat sink for the engine lubricating oil is the engine fuel, using the heat exchanger 26. The practical capacity of this heat sink varies according to the temperature of the fuel entering the fuel system and also according to the flow rate of the fuel through the fuel system to the combustor. Once the practical capacity of the fuel as a heat sink is reached, as monitored by the EEC through temperature sensors in the fuel system, the heat exchanger 12 is caused to receive cool air 17 from the engine bypass duct 25 through the variable control valve 20, the air flow 17 through the heat exchanger 12 being modulated by valve 20 in response to a fuel temperature signal from the engine fuel system. Thus, the oil passing through the heat exchanger 12 will be cooled by the engine bypass air and limiting of the fuel temperature is achieved by indirect fuel cooling through pre-cooling the oil before it flows into the heat exchanger 26.

The actuator of valve 20 is powered by either engine fuel or compressor air. Alternatively, the actuator may electrically powered. In the former case, modulation of the valve 20 via the actuator is achieved by a servo (not shown) connected to the EEC. In the latter case EEC control is direct to the actuator. A positional feedback signal to the engine controller is provided by a linear variable differential transformer or a similar device. For safety reasons, the failure mode of the modulating valve 20 is in the open position.

Although not shown in the simplified diagram, various additional fuel flow paths may be provided in the fuel system in order to recirculate fuel through earlier parts of the fuel system which is not needed by later parts of the fuel system. Recirculation of fuel through the fuel pumps increases its temperature due to the work done on it, and at low engine powers, when a greater proportion of fuel is being recirculated, high fuel temperatures may be a particular problem. With valve 20 open, the heat exchanger 12 can provide sufficient indirect cooling of the low pressure part of the fuel system to prevent this problem.

In the above mentioned second control mode of the heat exchange system 10, engine bypass airflow through the heat exchanger 12 is again controlled by the fully variable valve 20, and the compressor air 21 is shut off. However, the required modulation of valve 20 is signalled from the EEC in response to an oil temperature signal from a sensor, instead of in response to a fuel temperature signal.

The third control mode is only used under certain cold fuel operating conditions, when the fuel heating effect through heat exchanger 26 from the circulating oil alone is inadequate to prevent a risk of ice particles in the fuel. Then it is necessary to provide supplementary heating of the fuel. The heat exchanger system 10 provides this when the fuel outlet temperature from the heat exchanger 26 is below zero degrees centigrade for a predetermined length of time, as measured by a fuel temperature sensor just before, or in, the fuel filter 28, which is the component most in danger of icing up. Indirect supplementary fuel heating is achieved by preheating the engine lubricating oil in the heat exchanger 12. In this case, the hot compresssor air flowing through the ducts 22 and 14, under the control of the valve 24, is used to heat the oil.

The valve 24 is operated under the command of a signal from the EEC in response to a low fuel temperature signal from the engine fuel system. The failure mode of this valve is in the closed position. It can be operated by a solenoid (not shown), since air flow through the valve 24 is not modulated in the presently preferred arrangement, the required air flow being controlled by a restrictor 30 in the duct 22. This arrangement is adequate for short duration usage of compressor air in heat exchanger 12. However, if compressor air is to be used in heat exchanger 12 for a long period, it would be desireable to utilise a valve 24 of the fully variable modulating type in order to minimise consumption of compressor air.

The fourth control mode is used following engine shutdown at altitude, because the fuel in and downstream of the heat exchanger 26 may need to be cooled to ensure satisfactory engine restarting in flight. Therefore, following an in-flight engine shutdown, combined with a fuel temperature sensor signal above the predefined upper limit, valve 20 is directed to the open position and the fan rotor is allowed to "windmill", i.e., rotate in the stream of air flowing through the bypass duct 25. It is arranged that the cooling capacity of the heat exchanger 12 at engine windmill conditions is such that the fuel temperature is reduced to the values required.

From the above description, it will be seen that the heat exchanger arrangement of the invention enables optimisation of the fuel temperature over a wider range of operating conditions than acheived using previously known arrangements.

We claim:

1. A heat exchange apparatus for a combustion engine having a lubrication oil system and a fuel supply system, comprising a first heat exchanger receiving oil from the lubrication oil system to put the oil in heat exchange relationship with a heat exchange medium, a second heat exchanger receiving the oil from the first heat exchanger, and placing the oil in heat exchange relationship with fuel in the fuel system and returning the engine oil to the engine, high and low temperature sources for said heat-exchange medium, and valve means for controlling flow from the high and low temperature sources of the heat exchange medium through the first heat exchanger such that the direction of heat flow between the oil and the heat exchange medium can be changed as necessary to prevent the fuel temperature from straying beyond predetermined limits.

2. An apparatus as claimed in claim 1, in which the heat exchange medium comprises air.

3. An apparatus as claimed in claim 1 in which the the low temperature source of the heat exchange medium comprises air from a bypass duct of a turbofan aeroengine.

4. An apparatus as claimed in claim 1 in which the high temperature source of the heat exchange medium comprises air from a compressor of the engine.

5. An apparatus as claimed in claim 1 in which the first heat exchanger is located in a duct having an intake and an outlet.

6. An apparatus as claimed in claim 5, in which the valve means is arranged to control the flow of the low temperature source of the heat exchange medium into the inlet to the duct and hence through the first heat exchanger.

7. An apparatus as claimed in claim 6, in which the valve means is arranged to control the flow of the low temperature source of the heat exchange medium in response to an oil temperature signal or a fuel temperature signal.

8. An apparatus as claimed in claim 5, in which the valve means is arranged to control the flow of the high temperature source of the heat exchange medium into the duct and hence through the first heat exchanger.

9. An apparatus as claimed in claim 8, in which the valve means is arranged to control the flow of the high temperature source of the heat exchange medium in response to a fuel temperature signal.

10. An apparatus as claimed in claim 1 in which the flow from the high temperature source of the heat exchange medium passes through a restrictor before entering the first heat exchanger.

11. A gas turbine engine including a heat exchange apparatus as claimed in claim 1.

* * * * *